April 8, 1941.  W. A. SHAW ET AL  2,237,715

ROTARY SWIVEL

Filed Dec. 18, 1939  2 Sheets-Sheet 1

Inventors
William A. Shaw
Arthur O. A. Hodge
By Lyon & Lyon
Attorneys

April 8, 1941.                W. A. SHAW ET AL                2,237,715
                                ROTARY SWIVEL
                          Filed Dec. 18, 1939              2 Sheets-Sheet 2

Inventors
William A. Shaw
Arthur O. A. Hodge
By Lyon & Lyon
Attorneys

Patented Apr. 8, 1941

2,237,715

UNITED STATES PATENT OFFICE 2,237,715

ROTARY SWIVEL

William A. Shaw, Los Angeles, and Arthur O. A. Hodge, Hermosa Beach, Calif., assignors to The National Supply Company, Pittsburgh, Pa., a corporation of Pennsylvania Application December 18, 1939, Serial No. 309,710

20 Claims. (Cl. 255—25)

This invention relates to rotary swivels and more particularly to an improvement in the hydraulic rotary swivel as used in connection with rotary well drilling apparatus.

An hydraulic rotary swivel as used in connection with rotary drilling apparatus is required to rotatably support the weight of the rotating drill string and such swivel must also provide means whereby the drilling fluid may be introduced into the drill string. In the conventional hydraulic rotary drilling construction there is employed a renewable element commonly referred to in the art as a "washpipe." The washpipe is inserted in the fluid conducting system to transmit the drilling fluid from the stationary supply, usually a gooseneck, to the rotating drill string or connector therefor carried by the swivel.

The washpipe in such structure is packed commonly with relation to the rotating element of the swivel and also with relation to the stationary gooseneck.

The drilling fluid utilized is very abrasive in character and is carried under high pressure so that frequent replacements of the packing and the washpipes are necessary. In the conventional construction of swivel, it is essential for each replacement in the washpipe to dismantle the upper portion of the swivel. The gooseneck is removed and before reassembly can be established, it is commonly necessary to remove the hose connections in order to enable proper alignment to be attained. The replacement of a washpipe in a conventional type swivel is thus a difficult and time-consuming operation.

In drilling operations such washpipe replacement ties up the entire drilling equipment and stops all operations. It is therefore the principal object of our invention to provide a hydraulic rotary swivel in which there is a washpipe so constructed and mounted as to enable its connection and easy replacement without necessitating the dismantling of the swivel, gooseneck or hose connections thereof.

Another object of this invention is to provide a washpipe construction for a hydraulic rotary swivel which includes a packing arrangement wherein the fluid under pressure which acts on the packing housing is balanced in such a manner that no resultant end thrust is developed on the packing housing.

Another object of this invention is to provide a resilient mounting for a washpipe packing housing which permits the housing of the packing, and hence the packing carried thereby, to have a self-aligning movement with respect to the washpipe.

Another object of our invention is to provide means for detachably securing the washpipe to one of the fluid conducting members of such hydraulic rotary swivel.

Other objects and advantages of this invention it is believed will be apparent from the following detailed description of a preferred embodiment thereof as illustrated in the accompanying drawings.

Figures 1, 2:
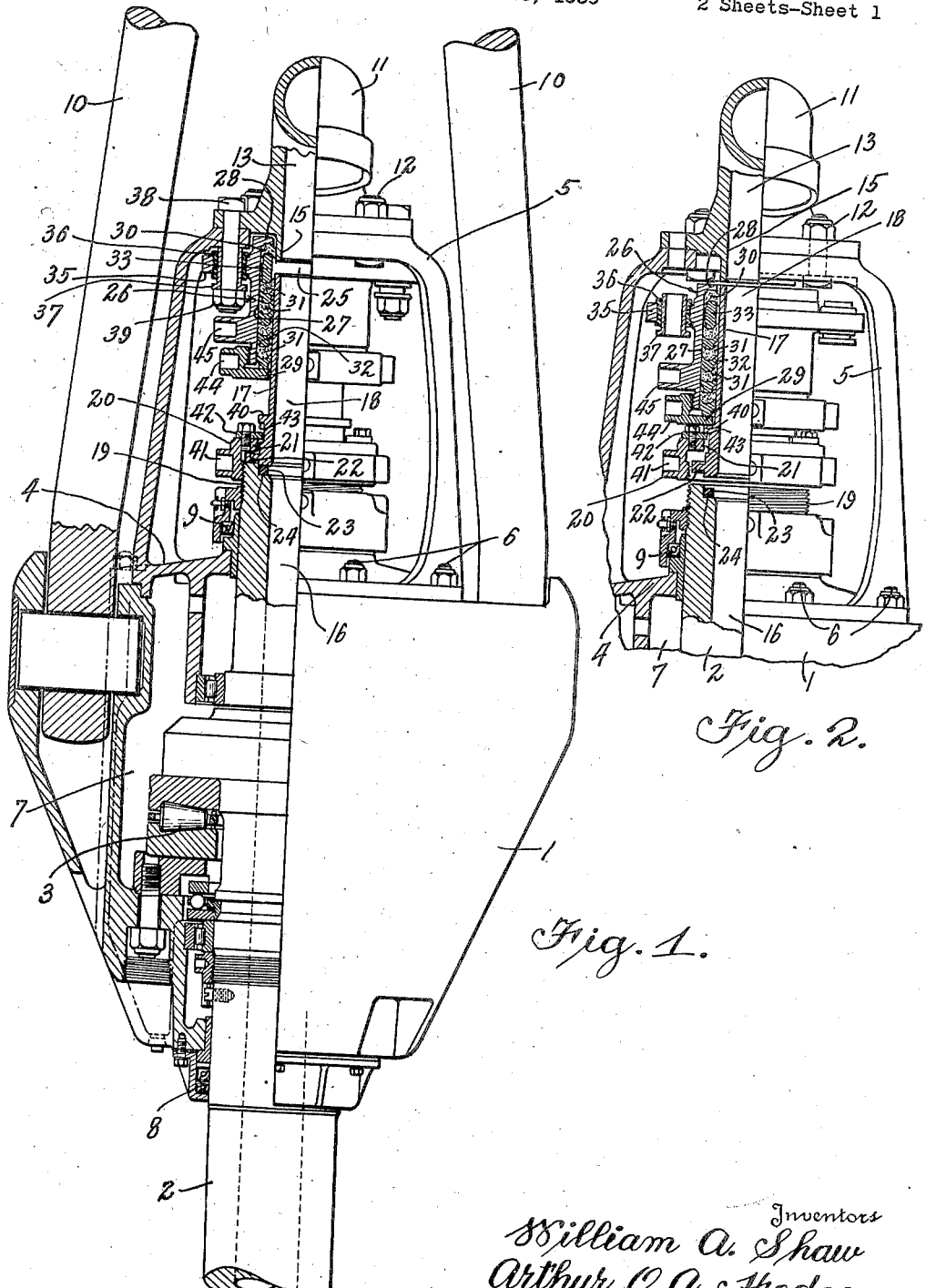
Figure 1 is an elevation partly in vertical section of a hydraulic rotary swivel incorporating the preferred embodiment of our invention.
Figure 2 is a fragmental view partly in vertical section illustrating the washpipe and packing in collapsed position preparatory to removal thereof.
Figure 3:
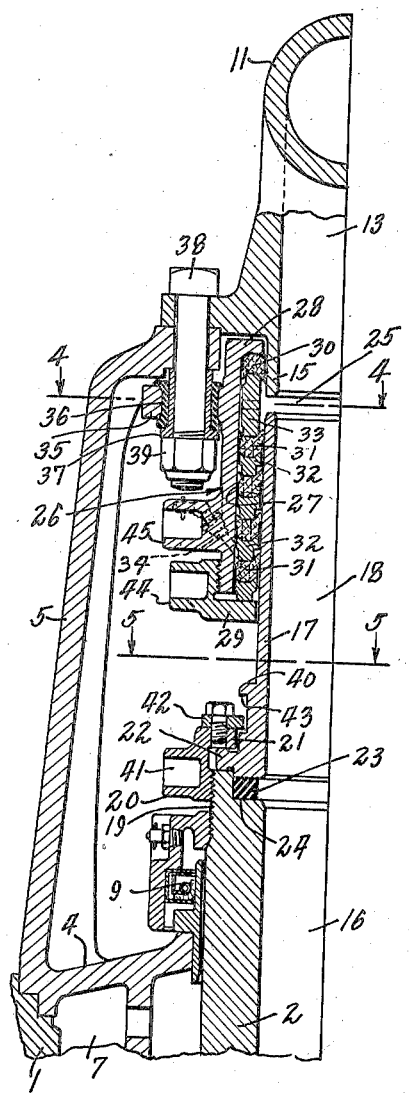
Figure 3 is an enlarged partial sectional elevation of the washpipe construction and assembly embodying our invention and illustrating the same on an enlarged scale.
Figure 4:
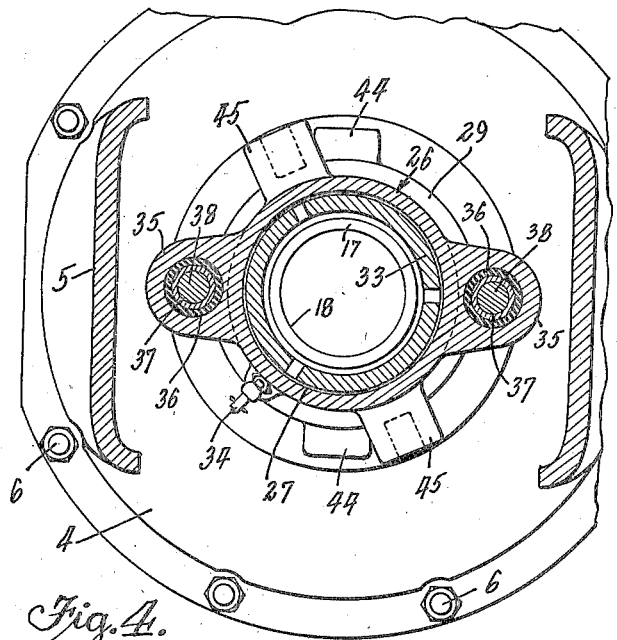
Figure 4 is a sectional end view taken substantially on the line 4—4 of Figure 3.
Figure 5:
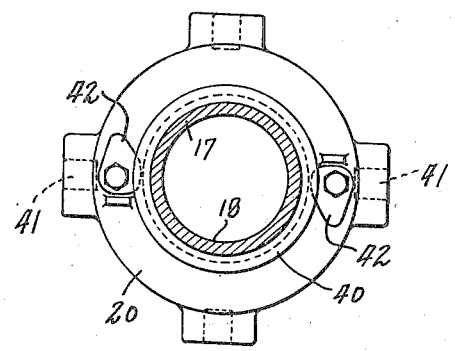
Figure 5 is a sectional end view taken substantially on the line 5—5 of Figure 3.

In the preferred embodiment of our invention as illustrated in the accompanying drawings, the hydraulic rotary swivel includes a body 1 which rotatably supports a spindle or rotating member 2. As is customary in such constructions, the rotating element 2 is suitably coupled with the drill string, not shown.

The spindle 2 is rotatably supported in the body 1 upon a thrust bearing 3. The upper end of the spindle 2 projects through a cover 4. The cover 4 forms a part of the supporting member 5. The supporting member 5 is secured to the body 1 by means of studs 6 and cooperates with the body 1 to form an enclosure 7 for the bearing 3. Sealing means 8 and 9 are customarily provided in such structures to prevent escape of lubricant as well as to exclude foreign matter from within the chamber or enclosure 7. A bail 10 is ordinarily provided for suspending the body 1.

At the upper end of the support 5 a gooseneck 11 is supported and held in position by means of bolts 12. The gooseneck 11 provides a fluid passageway 13, the intake end of which is connected to the customary hose (not shown) and the discharge end is formed as a downwardly projecting tube 15. The tubular portion 15 is positioned in alignment with the fluid passage 16 formed through the rotary spindle 2.

Interposed between the rotary spindle 2 and the tubular portion 15 of the gooseneck 11 is a washpipe 17 which has a central fluid passage 18 adapted to connect the fluid passages 13 and 16.

In accordance with our invention, the washpipe 17 is of a length less than the distance between the upper end of the spindle 2 and the lower end of the tubular portion 15 of the gooseneck 11, such distance being indicated by the letter "D" in Figure 2. It will be obvious that the washpipe 17 may be fixed with respect to either stationary gooseneck 11 or, as illustrated in the preferred construction, may be fixed to the spindle 2 so as to rotate therewith.

In the preferred construction as illustrated the washpipe 17 is removably secured to the upper end of the spindle 2 as follows: The upper end of the spindle 2 is threaded as indicated at 19 to receive a flange nut 20. The flange 21 of the flange nut 20 is adapted to engage the annular abutment 22 of the washpipe 17 and to clamp the washpipe 17 against the upper end of the spindle 2. A rubber packing ring 23 is interposed between the end of the washpipe 17 and a shoulder 24 formed within the spindle 2 to provide a leak-proof joint at this point.

When the washpipe 17 is thus secured in operative position upon the spindle 2, an annular clearance space 25 exists between the upper end of the rotating washpipe 17 and the lower end of the stationary tube 15. Encircling this annular clearance space is a packing container or housing 26.

The packing container 26 has a central cylindrical bore 27. The container 26 is formed at its upper end with an annular flange 28 which defines the upper end of the bore 27. A detachable end flange 29 defines the lower end of the bore 27. The end flanges 28 and 29 do not contact the outer walls of the tube portion 15 or the washpipe 17 but on the contrary, are formed to provide substantial clearance therewith.

Packing means are provided for packing the packing carrier or housing 26 to the tubular portion 15 of the gooseneck 11 and to the rotating washpipe 17. There is thus provided a stationary packing, or a packing required between two stationary elements, and the packing required between the stationary carrier 26 and the rotating washpipe 17. It will be obvious, however, that if the washpipe 17 were clamped in position so as to remain stationary, that the positions of these packings would be reversed. The stationary packing between the carrier 26 and the tubular portion 15 is composed of the packing ring 30. The rotating packing means consists of a plurality of spaced packing rings 31 interposed between packing carrier 26 and the rotating washpipe 17. The packing may be of any suitable or desirable construction and is herein illustrated as being composed of a series of packing rings 31 held spaced by means of suitable spacing rings 32.

An annular spacer 33 is interposed between the packing ring 30 and the packing assembly of the rotating packing connection. A grease fitting 34 is provided for introducing lubricant under pressure into the packing recess. The packing carrier or housing 26 is provided with a pair of outwardly extending carrier arms 35 for its support. Each of the carrier arms 35 is adapted to receive a rubber bushing 36. Positioned within each rubber bushing 36 is a metallic sleeve 37. Bolts 38 are passed through the metallic sleeves 37 and through the supporting means 5. Nuts 39 are threaded to the bolts 38 to support the packing carrier or housing 26. The bolts 38 also pass through the flange of the gooseneck 11 to aid in maintaining the same upon the support 5.

The connection as thus provided through the use of the rubber bushings 36 permits self-aligning movement of the packing container or housing 26 relative to the washpipe 17.

It will be apparent from the foregoing that as the fluid pressure is admitted into the container 26 at a position between the packing elements 30 and 31, since the outer diameters of the washpipe 17 and tube 15 are substantially the same, and since the bore 27 of the container 26 is of uniform size throughout its length, it follows that the end-areas of the packing elements 30 and 31 are equal, and hence the resultant end thrust on the packing container 26 due to fluid pressure is balanced out. It will therefore be apparent that the carrier arms 35 are not required to receive end thrust due to fluid pressure but need only support the relatively light weight of the packing assembly and to resist the frictional drag of the packing rings 31.

The supporting means 5 above the cover portion 4 does not completely surround the washpipe 17 but leaves openings on both sides. The washpipe 17 and packing assembly may therefore be removed through either of these lateral openings without disconnecting the gooseneck 11 or the hose connection. When it is desired to effect this operation, the nuts 39 are removed from the bolts 38, permitting the packing container 26 to be lowered on the washpipe 17 until the lower flange 29 strikes the shoulder 40. The nut 20 is then unthreaded from the rotary spindle 2. A bar (not shown) may be inserted into the opening 41 if required, in order to unthread the nut 20. Should the washpipe 17 exhibit a tendency to stick to the spindle 2, the lugs 42 are turned until a portion of them extend under the abutment 43 of the washpipe 17. Further unscrewing of the nut 20 will then cause the lugs 42 to engage the abutment 43 and to thereby jack the washpipe 17 away from the spindle 2. The parts are then moved to the position shown in Figure 2 and may be removed laterally through one of the openings in the support 5.

When the washpipe 17 and packing container 26 have been removed from the swivel, the pivoted lugs 42 are turned until they clear the abutment 43. The washpipe 17 and nut 20 may then be separated.

To install new packing in the container 26, the detachable flange 29 is unthreaded. Bosses 44 and 45 providing bar-receiving openings are provided for this purpose.

In practice it will be found more convenient and more expeditious to replace the packing container 26 with a new container filled with new packing and assembled ready for use. Thus it may also be found more expeditious to replace the washpipe and packing with a complete new assembly of washpipe and packing and all without detaching the gooseneck or hose connections. The saving in time for replacing the swivel washpipe is extremely important in drilling operations because with the swivel out of service the entire drilling operation must be suspended until the swivel can be again placed in service. A divisional application, Serial No. 381,754, filed March 4, 1941, is directed to the washpipe construction per se.

Having fully described our invention, it is to be understood that we do not wish to be limited to the details herein set forth, but our invention is of the full scope of the appended claims.

We claim:

1. In a rotary swivel, the combination of a stationary body, a rotary member supported by the body, a fluid passageway axially of said rotary member, a support on said body, a stationary member having a fluid passageway, said stationary member being mounted on said support in spaced relationship above said rotary member, means to connect said fluid passageways, said means including a conduit element insertable laterally into position between said stationary and rotary members, means to secure said conduit element relative to one of said members, and means to prevent leakage of fluid between said conduit element and the other of said members.

2. In a rotary swivel, the combination of a body, a spindle rotatably supported by the body, a fluid passageway axially of said spindle, a support on said body, a stationary member having a fluid passageway, said stationary member being mounted on said support in spaced relationship above said rotary member, and positioned so that one end of its fluid passageway is in axial alignment with the fluid passageway in said spindle, means to connect said fluid passageways including a conduit element insertable laterally into position between said spindle and said stationary member, means to secure said conduit element to rotate with said spindle, and packing means adapted to prevent leakage of fluid between said conduit element and said stationary member.

3. In a rotary swivel, the combination of a stationary body, a spindle member rotatably supported by the body, a fluid passageway axially of the spindle member, a support on said body having a lateral opening at one side, a stationary member mounted on said support in spaced relationship above said spindle member, a fluid passageway in said stationary member, means to connect said fluid passageways including a conduit element insertable through said lateral opening in the support into position between said spindle member and said stationary member, means to secure said conduit element relative to one of said members, and means to prevent leakage of fluid between said conduit element and the other of said members.

4. In a rotary swivel, the combination of a body, a spindle rotatably supported by the body, a fluid passageway axially of said spindle, a support on said body having a plurality of legs with openings therebetween, a gooseneck secured upon said support in spaced relationship above said spindle, a fluid passageway in said gooseneck having one end thereof positioned in axial alignment with the fluid passageway in said spindle, means to connect said fluid passageways, said means including a washpipe insertable laterally through one of the openings in the support into position between said spindle and said gooseneck, means to secure said washpipe to said spindle, and packing means adapted to prevent leakage of fluid between said washpipe and said gooseneck.

5. In a rotary swivel, the combination of a stationary member providing a housing, a rotary element rotatably supported by the stationary member and having its upper end projecting from said housing, sealing means between the stationary member and the projecting end of said rotary element, a stationary element secured upon the upper end of said stationary member in vertically spaced relation with respect to the upper end of said rotary element, a fluid passageway in said stationary element having the discharge end thereof positioned in axial alignment with the fluid passageway in said rotary element, means including a washpipe adapted to connect said fluid passageways, the over-all length of said washpipe being less than the clearance distance between the upper end of said rotary element and the discharge end of the fluid passageway in said stationary element, means to secure said washpipe to one of said elements, and packing means to prevent leakage of fluid between said washpipe and the other of said elements.

6. In a rotary swivel, the combination of a stationary member providing a housing, a spindle rotatably supported by the stationary member and having its upper end projecting from said housing, a fluid passageway axially of said spindle, sealing means between the stationary member and the projecting end of said spindle, a gooseneck secured upon the upper end of said stationary member in vertically spaced relation with respect to the upper end of said spindle, a fluid passageway in said gooseneck having the discharge end thereof positioned in axial alignment with the fluid passageway in said spindle, means including a washpipe adapted to connect said fluid passageways, the overall length of said washpipe being less than the clearance distance between the upper end of said spindle and the discharge end of the fluid passageway in said gooseneck, means to secure said washpipe to said spindle, and packing means to prevent leakage of fluid between said washpipe and said gooseneck.

7. In a rotary swivel, the combination of a stationary body, a spindle member rotatably supported by the body, a fluid passageway axially of said spindle member, a support on said body, a gooseneck member mounted on said support in spaced relationship above said spindle member, a fluid passageway in said gooseneck member, means including a washpipe interposed between said spindle member and said gooseneck member and adapted to connect said passageways, means to secure the washpipe to one of said members, packing means encircling said washpipe and adapted to prevent leakage of fluid between said washpipe and the other of said members, said packing means being axially shiftable along said washpipe into an inoperative position wherein the over-all length of the washpipe and packing means is less than the clearance distance between the spindle member and the gooseneck member.

8. In a rotary swivel, the combination of a body, a spindle rotatably supported by the body, a fluid passageway axially of said spindle, a support on said body, a gooseneck mounted on said support in spaced relationship above said spindle, a fluid passageway in said gooseneck, means including a washpipe interposed between said spindle and said gooseneck and adapted to connect the said passageways, means to secure the washpipe to rotate with the spindle, packing means encircling said washpipe and adapted to prevent leakage of fluid between said washpipe and said gooseneck, said packing means being axially shiftable along said washpipe into an inoperative position wherein the over-all length of the washpipe and packing means is less than the clearance distance between the spindle and gooseneck.

9. In a rotary swivel, the combination of a stationary body, a spindle member rotatably supported by the body, a fluid passageway axially of the spindle member, a support on said body having a lateral opening, a gooseneck member mounted on said support in spaced relationship above said spindle member, a fluid passageway in said gooseneck member, a washpipe operatively interposed between said fluid passageways, the over-all length of said washpipe being less than the clearance distance between the gooseneck member and the spindle member, securing means associated with said washpipe adapted to secure the washpipe to one of said members, packing means associated with said washpipe adapted to prevent leakage of fluid between the washpipe and the other of said members, said securing means and said packing means being axially shiftable into an inoperative position on said washpipe, whereby the washpipe, securing means and packing means may be removed laterally through said opening as a unit.

10. In a rotary swivel, the combination of a body, a rotary member supported on the body, a conduit disposed axially of said rotary member, a stationary part having a passageway adapted to deliver fluid under pressure into said conduit, the discharge end of said passageway comprising a stationary tube member positioned in alignment with said conduit, a container encircling adjacent ends of the relatively rotatable members and cooperating therewith to form an annular packing recess at each end of said container, packing means in each of said recesses, the pressure of the fluid being admitted into the container between said packing means, the end-areas of said recesses being substantially equal whereby axial end thrust on said container due to pressure of the fluid is balanced out, and means to prevent rotation of the container relative to one of said members.

11. In a rotary swivel, the combination of a body, a spindle rotatably supported on the body, a washpipe detachably secured to rotate with the spindle, a gooseneck supported by the body, a passageway in said gooseneck adapted to deliver fluid under pressure into said washpipe, the discharge end of said passageway comprising a stationary tube positioned in alignment with said washpipe, a container encircling adjacent ends of said washpipe and tube and cooperating therewith to form an annular packing recess at each end of said container, end flanges on said container adapted to define the outer ends of said annular packing recesses, packing means in each of said recesses, the pressure of the fluid being admitted into the container between said packing means, the end-areas of said recesses being substantially equal whereby axial end thrust on said container due to pressure of the fluid is balanced out, and means to prevent rotation of said container.

12. In a rotary swivel, the combination of a body, a rotary member supported on the body, a conduit disposed axially of said rotary member, a stationary part having a passageway adapted to deliver fluid under pressure into said conduit, the discharge end of said passageway comprising a stationary tube member positioned in alignment with said conduit, a container encircling adjacent ends of the relatively rotatable members and cooperating therewith to form an annular packing recess at each end of said container, packing means in each of said recesses, the pressure of the fluid being admitted into the container between said packing means, means to prevent rotation of the container relative to one of said members, and means to introduce lubricant into the recess between the container and the other of said members.

13. In a rotary swivel, the combination of a body, a spindle rotatably supported on the body, a washpipe detachably secured to rotate with the spindle, a gooseneck supported by the body, a passageway in said gooseneck adapted to deliver fluid under pressure into said washpipe, the discharge end of said passageway comprising a stationary tube positioned in alignment with said washpipe, the stationary tube and the rotary washpipe being substantially the same outer diameter, a packing container having a central cylindrical bore of uniform diameter, upper and lower end flanges on said container defining the ends of said bore, primary packing means positioned within said bore adjacent the lower end flange and encircling said washpipe, secondary packing means positioned within said bore adjacent the upper end flange and encircling said stationary tube, the pressure of the said fluid being admitted into the container between said primary and secondary packing means, whereby axial end thrust on said container due to pressure of the fluid is balanced out.

14. In a rotary swivel, the combination of a body, a rotary member supported on the body, a conduit disposed axially of said rotary member, a stationary part having a passageway adapted to deliver fluid under pressure into said conduit, the discharge end of said passageway comprising a tubular member positioned in alignment with said conduit, a packing container having a central bore, upper and lower end flanges on said container defining the ends of said bore, a first packing means positioned within said bore adjacent one of said end flanges and encircling the stationary member, a second packing means positioned within said bore adjacent the other of said end flanges and encircling the rotary member, the pressure of the said fluid being admitted into the container at a location intermediate said first and second packing means, and torque resisting means associated with said container acting to oppose the frictional drag of one of said packing means incident to the relative rotation of the members.

15. In a rotary swivel, the combination of a body, a spindle rotatably supported on the body, a washpipe detachably secured to rotate with the spindle, a gooseneck supported by the body, a passageway in said gooseneck adapted to deliver fluid under pressure into said washpipe, the discharge end of said passageway comprising a stationary tube positioned in alignment with said washpipe, a packing container having a central bore, upper and lower end flanges on said container defining the ends of said bore, primary packing means positioned within said bore adjacent the lower end flange and encircling said washpipe, secondary packing means positioned within said bore adjacent the upper end flange and encircling said stationary tube, the pressure of the said fluid being admitted into the container between said primary and secondary packing means.

16. In a rotary swivel, the combination of a stationary member, a rotary member supported thereby, a fluid passageway in each of said members, the passageway in said stationary member being adapted to deliver fluid under pressure into the passageway in said rotary member, means adapted to prevent leakage of fluid at the junction of said passageways, said means including a housing encircling a portion of one of said members to define an annular packing recess, packing within said recess, and resilient torque resisting means associated with said housing acting to oppose the frictional drag of the packing incident to relative rotation of the members.

17. In a rotary swivel, the combination of a stationary member, a rotary member supported thereby, a fluid passageway in each of said members, the passageway in said stationary member being adapted to deliver fluid under pressure into the passageway in said rotary member, packing means adapted to prevent leakage of fluid at the junction of said passageways, said packing means including a packing housing encircling at least one of said members, means whereby said housing may be maintained relatively stationary with respect to one of said members, said means being adapted to permit self-aligning movement of said housing relative to said stationary and rotary members.

18. In a rotary swivel, the combination of a stationary member, a rotary member supported thereby, a fluid passageway in each of said members, the passageway in said stationary member being adapted to deliver fluid under pressure into the passageway in said rotary member, packing means adapted to prevent leakage of fluid at the junction of said passageways, said packing means including a packing housing encircling the rotary member, means whereby said housing may be maintained relatively stationary with respect to said stationary member, said means including resilient torque resisting means adapted to permit self-aligning movement of said housing relative to said stationary and rotary members.

19. In a rotary swivel, the combination of a stationary body, a spindle rotatably mounted on the body, a washpipe detachably secured to rotate with said spindle, a support on said body, a gooseneck mounted on said support, a passageway in said gooseneck adapted to deliver fluid under pressure into said washpipe, packing means adapted to prevent leakage of fluid at the junction between said gooseneck and said washpipe, said packing means including a packing housing encircling a portion of said washpipe, a plurality of torque arms on said housing, a plurality of securing elements carried on said support, and resilient means adapted to connect each torque arm to one of said securing elements, whereby said housing may have self-aligning movement relative to said support.

20. In a rotary swivel, the combination of a stationary body, a spindle member rotatably mounted thereon, a stationary gooseneck member carried by said stationary body, a fluid passageway in each of said members, a washpipe interposed between said members and adapted to connect said passageways, packing means adapted to prevent leakage of fluid between the washpipe and one of said members, means whereby said washpipe may be detachably secured relative to the other of said members, said means including a pair of axially spaced abutments on said washpipe, a nut threaded upon the latter said member and adapted to engage one of said abutments to maintain the washpipe in operative position, and an element on said nut adapted to engage the other of said abutments, whereby the washpipe may be moved into an inoperative position upon said nut being unthreaded.

WILLIAM A. SHAW.
ARTHUR O. A. HODGE.